US009644043B2

(12) United States Patent
Miyamoto et al.

(10) Patent No.: US 9,644,043 B2
(45) Date of Patent: May 9, 2017

(54) METHOD FOR PRODUCING HYDROGENATED PETROLEUM RESIN

(71) Applicant: IDEMITSU KOSAN CO., LTD., Chiyoda-ku (KR)

(72) Inventors: Shinji Miyamoto, Ichihara (JP); Hideki Tanimura, Ichihara (JP); Yuichi Ohkawa, Ichihara (JP); Makoto Kashima, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/107,738

(22) PCT Filed: Nov. 19, 2014

(86) PCT No.: PCT/JP2014/080585
§ 371 (c)(1),
(2) Date: Jun. 23, 2016

(87) PCT Pub. No.: WO2015/098370
PCT Pub. Date: Jul. 2, 2015

(65) Prior Publication Data
US 2016/0319047 A1    Nov. 3, 2016

(30) Foreign Application Priority Data

Dec. 25, 2013  (JP) .................... 2013-267833

(51) Int. Cl.
*C08F 6/10* (2006.01)
*C08F 8/04* (2006.01)
(Continued)

(52) U.S. Cl.
CPC ............... *C08F 6/10* (2013.01); *C08F 8/04* (2013.01); *C08F 212/08* (2013.01);
(Continued)

(58) Field of Classification Search
CPC .......... C08F 6/10; C08F 8/04; C08F 236/045; C08F 236/10; C08C 19/02
See application file for complete search history.

(56) References Cited

U.S. PATENT DOCUMENTS

| 6,511,756 | B1 * | 1/2003 | Obuchi ................. C08G 61/08 |
| | | | 156/244.11 |
| 2003/0139535 | A1 * | 7/2003 | Haga .......................... C08F 8/04 |
| | | | 525/338 |

(Continued)

FOREIGN PATENT DOCUMENTS

| JP | 53-98383 A | 8/1978 |
| JP | 2-51502 A | 2/1990 |

(Continued)

OTHER PUBLICATIONS

International Search Report issued Jan. 13, 2015, in PCT/JP2014/080585 filed Nov. 19, 2014.

*Primary Examiner* — Robert C Boyle
(74) *Attorney, Agent, or Firm* — Oblon, McClelland, Maier & Neustadt, L.L.P.

(57) ABSTRACT

A manufacturing method of a hydrogenated petroleum resin of the invention includes: a thermal polymerization step of thermally polymerizing a cyclopentadiene compound and a vinyl aromatic compound; a hydrogenation reaction step; and a volatile-component removal step, in which the volatile-component removal step is performed using a volatile-component removal device including: a pressuring device configured to pressurize a reaction mixture; a heater configured to heat the reaction mixture pressurized by the pressuring device under pressure; a decompression unit including a decompression space, a pressure of which is reduced and into which the pressurized and heated reaction mixture is flowed; and a path member including a flow path through which the reaction mixture passes and provided in the decompression space so that the reaction mixture flowed (Continued)

in the decompression space of the decompression unit passes through the flow path.

9 Claims, 2 Drawing Sheets

(51) Int. Cl.
*C08F 212/08* (2006.01)
*C08F 232/06* (2006.01)
*C08F 232/08* (2006.01)

(52) U.S. Cl.
CPC .......... *C08F 232/06* (2013.01); *C08F 232/08* (2013.01); *C08F 2800/20* (2013.01)

(56) References Cited

U.S. PATENT DOCUMENTS

| | | | | |
|---|---|---|---|---|
| 2010/0087692 A1* | 4/2010 | Yoshimura | ............... | C10G 9/00 585/252 |
| 2014/0058033 A1* | 2/2014 | Kashima | ............... | C08F 212/08 524/554 |
| 2014/0148550 A1* | 5/2014 | Hayashi | ............... | C08F 240/00 525/51 |

FOREIGN PATENT DOCUMENTS

| | | |
|---|---|---|
| JP | 2001-316455 A | 11/2001 |
| JP | 2012-251051 A | 12/2012 |
| WO | WO 2012/165522 * | 12/2012 |
| WO | WO 2012/165532 * | 12/2012 |
| WO | WO 2004/056882 A1 | 2/2014 |

* cited by examiner

METHOD FOR PRODUCING HYDROGENATED PETROLEUM RESIN

TECHNICAL FIELD

The present invention relates to a manufacturing method of a hydrogenated petroleum resin.

BACKGROUND ART

A hot-melt adhesive has been increasingly used in various fields because of excellent high-speed coating property, rapid curing property, solventless property, barrier property, energy saving property, economic performance and the like. A generally usable hot-melt adhesive is exemplified by a composition containing: a base polymer such as a styrene-isoprene-styrene block copolymer and a hydride thereof; a tackifier resin; and a plasticizer. As the tackifier resin, a hydrogenated petroleum resin and the like are used. The hydrogenated petroleum resin used for the tackifier resin requires tackiness. For instance, there has been proposed a manufacturing method of a hydrogenated petroleum resin starting from a cyclopentadiene compound and a vinyl aromatic compound (start materials), where a residual amount of a low-molecular-weight component in the hydrogenated petroleum resin (product) is controlled (for instance, Patent Literature 1).

In such a hydrogenated petroleum resin, volatile components such as unreacted monomers, a solvent, and low-molecular-weight components remain in a reaction mixture. Since the volatile components deteriorate a quality of the product, the volatile components need to be removed so much as not to adversely affect a quality of the product. Accordingly, a method of removing the volatile components from the reaction mixture using a so-called thin-film evaporator is generally employed.

CITATION LIST

Patent Literature(s)

Patent Literature 1: WO2004/056882 A

SUMMARY OF THE INVENTION

Problem(s) to be Solved by the Invention

A thin-film evaporator used in the manufacturing method of the hydrogenated petroleum resin disclosed in Patent Literature 1 and the like is suitable as a volatile-component removal device used for the hydrogenated petroleum resin since the reaction mixture stays in the evaporator for a short time to be inhibited from thermal deterioration. However, since the thin-film evaporator is expensive in terms of equipment costs, another volatile-component removal device substitutable for the thin-film evaporator has been demanded.

Accordingly, an object of the invention is to provide a manufacturing method of a hydrogenated petroleum resin, the method capable of reducing the equipment costs while improving tackiness of a tackifier resin.

Means for Solving the Problem(s)

In order to solve the above-described problems, the invention provides a manufacturing method of a hydrogenated petroleum resin as follows.

According to an aspect of the invention, a manufacturing method of a hydrogenated petroleum resin of the invention includes: a thermal polymerization step of thermally polymerizing a cyclopentadiene compound and a vinyl aromatic compound; a hydrogenation reaction step of hydrogenating a copolymer obtained in the thermal polymerization step in the presence of a hydrogenation solvent to perform a hydrogenation reaction; and a volatile-component removal step of separating a hydrogenated petroleum resin from a reaction mixture obtained by the hydrogenation reaction step so that a hydrogenated low-molecular-weight component remains in a range from 6 mass % to 10 mass % in the hydrogenated petroleum resin, in which the volatile-component removal step is performed using a volatile-component removal device including: a pressuring device configured to pressurize the reaction mixture; a heater configured to heat the reaction mixture pressurized by the pressuring device under pressure; a decompression unit comprising a decompression space, a pressure of which is reduced and into which the pressurized and heated reaction mixture is flowed; and a path member including a flow path through which the reaction mixture passes and provided in the decompression space so that the reaction mixture flowed in the decompression space of the decompression unit passes through the flow path.

In the above aspect of the invention, a residual amount of a low-molecular-weight component in the hydrogenated petroleum resin (product) is controlled to fall within a predetermined range. By this treatment, tackiness of a tackifier resin is retainable.

Examples of the volatile-component removal device include a flash evaporator and an extruder in addition to the thin-film evaporator. Examples of the flash evaporator include a plate-fin type flash evaporator, a preheating type flash evaporator and a flash evaporator combined with an extruder. The preheating type flash evaporator includes a pressuring device, a heater and a decompression unit and is configured to volatilize a volatile component in the reaction mixture by flowing the pressurized and heated reaction mixture into the decompression space. Consequently, the preheating type flash evaporator requires that the reaction mixture is subjected to a high pressure and a high temperature, as compared with when the thin-film evaporator is used. Accordingly, when the residual amount of the low-molecular-weight component in the hydrogenated petroleum resin is controlled within a predetermined range as recited in the hydrogenated petroleum resin in the above aspect of the invention, the preheating type flash evaporator has been believed to be unusable. In contrast, the inventors have overturned such a typical technical knowledge and have found that performance of the hydrogenated petroleum resin is not deteriorated even though the reaction mixture is temporarily subjected to a high pressure and a high temperature using the preheating type flash evaporator. Moreover, the preheating type flash evaporator has a removal performance of the volatile component inferior to that of the thin-film evaporator. However, when the preheating type flash evaporator is provided with a particular path member in the decompression space of the decompression unit, even the preheating type flash evaporator can remove the volatile component in the reaction mixture comparably to the thin-film evaporator. Although a reason for this performance of the preheating type flash evaporator is not entirely clear, the inventors presume the reason as follows. Specifically, in the above aspect of the invention, the reaction mixture flowed in the decompression space of the decompression unit passes through the flow path of the path member disposed in the decompression space. At this time, since the reaction mixture flows along an interior wall of the flow path, the reaction mixture is brought into a thin film. In such a thin film, the volatile component in the reaction mixture is easily volatilizable. Thus, the inventors presume that the volatile component is appropriately removable even using the preheating type flash evaporator at inexpensive equipment costs.

In the manufacturing method according to the above aspect of the invention, a flow rate (F) of the reaction mixture, an average diameter (D) of the flow path, and the number (N) of the flow path preferably satisfy a condition expressed by a numerical formula (F1) below.

$$F/(\pi D \times N) \leq 1500 \text{ kg}/(h \cdot m) \tag{F1}$$

In the manufacturing method according to the above aspect of the invention, the hydrogenated petroleum resin obtained by the volatile-component removal step preferably has a softening point in a range from 90 degrees C. to 160 degrees C.

In the manufacturing method according to the above aspect of the invention, the average diameter (D) of the flow path is preferably in a range from 0.001 m (1 mm) to 0.02 m (20 mm).

In the manufacturing method according to the above aspect of the invention, the number (N) of the flow path is preferably in a range from 1 to 100000.

In the manufacturing method according to the above aspect of the invention, the reaction mixture preferably has a viscosity in a range from 0.01 Pa·s to 1.0 Pa·s at a temperature in the volatile-component removal step, the viscosity being measured by a method according to JIS Z8803.

In the manufacturing method according to the above aspect of the invention, the heater is preferably configured to heat the reaction mixture to a range from 100 degrees C. to 350 degrees C.

In the manufacturing method according to the above aspect of the invention, the pressuring device is preferably configured to pressurize the reaction mixture to 0.1 MPaG or more.

In the manufacturing method according to the above aspect of the invention, the decompression unit is configured to depressurize the reaction mixture to 6.67 kPaAbs or less.

According to the above aspect of the invention, a manufacturing method of a hydrogenated petroleum resin capable of reducing equipment costs while improving tackiness of a tackifier resin can be provided.

BRIEF DESCRIPTION OF DRAWING(S)

DESCRIPTION OF EMBODIMENT(S)

Figure 1:
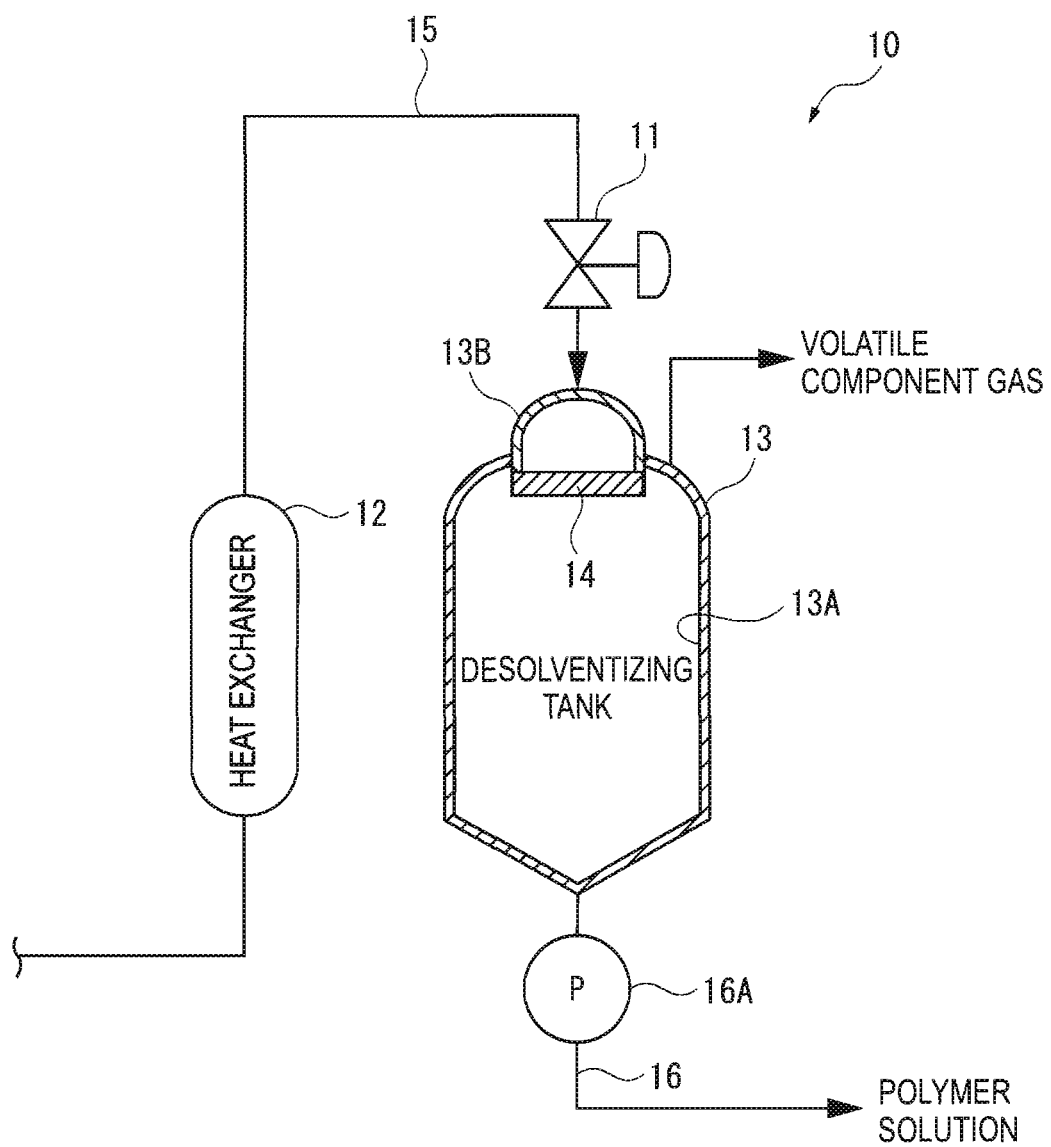
FIG. 1 is a block diagram showing an overall structure of a volatile-component removal device in an exemplary embodiment.

Exemplary embodiment(s) of the invention will be described below with reference to the attached drawings.

Embodiment(s)

A manufacturing method of a hydrogenated petroleum resin includes a thermal polymerization step, a hydrogenation reaction step, and a volatile-component removal step as described below. In the exemplary embodiment, since the volatile-component removal step is conducted using a volatile-component removal device shown in FIG. 1, tackiness of a tackifier resin is improved and equipment costs are reduced.

Volatile-Component Removal Device

First, a volatile-component removal device 10 used in the exemplary embodiment will be described.

The volatile-component removal device used in the exemplary embodiment includes: a pressuring device 11 configured to pressurize a reaction mixture obtained by the hydrogenation reaction step; a heater 12 configured to heat the reaction mixture pressurized by the pressuring device 11 under pressure; a decompression unit 13 including a decompression space, a pressure of which is reduced and into which the pressurized and heated reaction mixture is flowed; and a path member 14 including a flow path 14A through which the reaction mixture can pass and provided in the decompression space so that the reaction mixture flowed in the decompression space of the decompression unit 13 passes through the flow path 14A.

The reaction mixture obtained by the hydrogenation reaction step is flowed into the volatile-component removal device 10 through a polymer solution inflow path 15.

As shown in FIG. 1, a transfer pump (not shown) configured to transfer a polymer solution (i.e., the reaction mixture obtained by the hydrogenation reaction step) to the decompression unit 13, a heat exchanger in a form of the heater 12, and a pressure control valve in a form of a pressuring device 11 are provided to the polymer solution inflow path 15, the pressuring device 11 being provided near the decompression unit 13 (i.e., on a downstream side of the heater 12).

The pressure control valve in a form of the pressuring device 11 is configured to control a pressure of the polymer solution so that the polymer solution flows through the polymer solution inflow path 15 under such a pressure as not to foam when heated by the heater 12. In other words, since a vapor pressure differs depending on a composition of the polymer solution, it is only necessary that the pressure under which the polymer solution does not foam is also set depending on the vapor pressure. Specifically, the polymer solution can be prevented from foaming by controlling the pressure to be higher than the vapor pressure.

The heat exchanger in a form of the heater 12 is configured to heat the polymer solution, for instance, with use of heat removed at the polymerization reaction. In other words, it is only required to heat the polymer solution to a high temperature at which the reaction mixture is not degraded and a vapor pressure allowing the volatile component to sufficiently foam when the reaction mixture is depressurized in a later stage is obtainable. Specifically, a degree of vacuum in a processing tank needs to be increased as the temperature is decreased, since a residual amount of the volatile component is determined depending on a vapor-liquid equilibrium value between the hydrogenated petroleum resin and the volatile component under conditions of the temperature and the pressure.

The decompression unit 13 includes a desolventizing tank in a decompression resistant structure defining a decompression space 13A, and a decompression device (not shown) configured to depressurize the decompression space 13A. The polymer solution is flowed into the desolventizing tank through the polymer solution inflow path 15 as shown in FIG. 1. Moreover, the decompression device is preferably used in common as a decompression device of a volatile-component gas recovering unit (not shown) to simplify the plant equipment.

Figure 2:
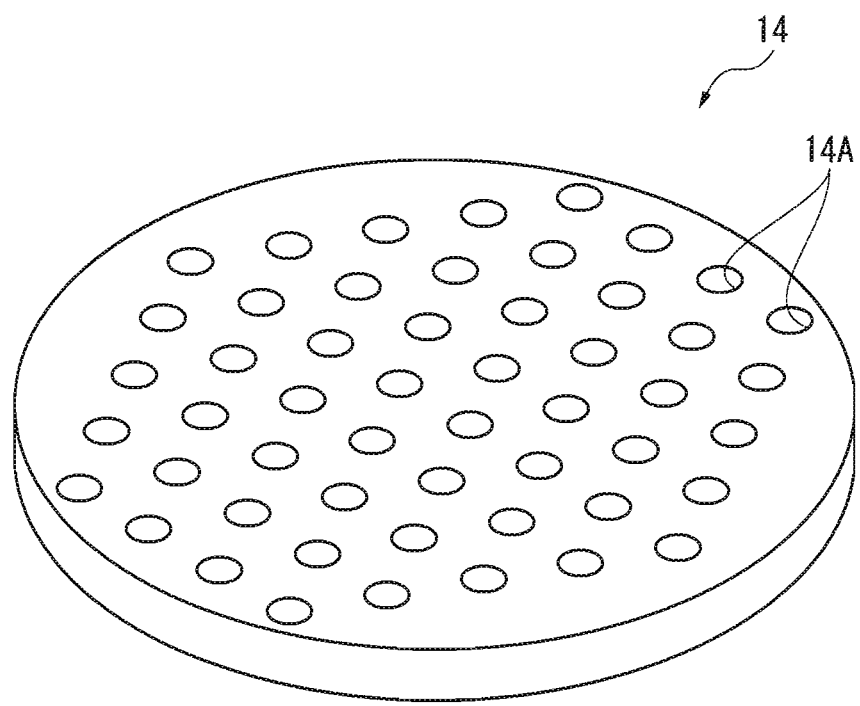
FIG. 2 is a perspective view showing a path member in the exemplary embodiment.

A dome 13B is provided to an upper portion of the desolventizing tank of the decompression unit 13 to which the polymer solution inflow path 15 is connected. The path member 14 is provided on the bottom of the dome 13B facing the decompression space 13A. As shown in FIG. 2, the path member 14 in a disc shape has a plurality of flow paths 14A axially penetrating the path member 14 along a thickness direction of the path member 14.

An average diameter (D) of each of the flow paths 14A is preferably in a range from 0.001 m (1 mm) to 0.02 m (20 mm), more preferably from 0.003 m (3 mm) to 0.006 m (6 mm). When the average diameter (D) is less than the above-described lower limit, the polymer solution becomes difficult to flow and a pressure loss is increased, so that a manufacturing efficiency tends to be difficult to improve. On the other hand, when the average diameter (D) exceeds the above-described upper limit, the polymer solution is insufficiently brought into a thin film, so that a removal performance of the volatile component tends to be deteriorated.

The number (N) of the flow paths 14A is preferably 140 or more, more preferably in a range from 300 to 11000 under conditions that a flow rate is 2000 kg/h and the average diameter (D) is 0.003 m (3 mm). When the number (N) is less than the above-described lower limit, the polymer solution tends to be insufficiently brought into a thin film. On the other hand, when the number (N) exceeds the above-described upper limit, an uneven flow tends to occur.

An outflow path 16 is connected to the bottom of the desolventizing tank of the decompression unit 13. The outflow path 16 includes a transfer pump 16A configured to transfer the polymer solution, from which the volatile component is highly removed, to a subsequent step (i.e., a pelletization step).

Manufacturing Method of Hydrogenated Petroleum Resin

Next, a manufacturing method of the hydrogenated petroleum resin in the exemplary embodiment will be described. The manufacturing method of the hydrogenated petroleum resin includes a thermal polymerization step, a hydrogenation reaction step, and a volatile-component removal step as described below.

Thermal Polymerization Step

In the thermal polymerization step, a cyclopentadiene compound and a vinyl aromatic compound are thermally polymerized.

Herein, examples of the cyclopentadiene compound include cyclopentadiene, methylcyclopentadiene, ethylcyclopentadiene, dimer thereof and co-dimers thereof. Examples of the vinyl aromatic compound include styrene, a-methylstyrene and vinyl toluene.

Though a mixture ratio of the cyclopentadiene compound and the vinyl aromatic compound is not particularly limited, the ratio (the cyclopentadiene compound:the vinyl aromatic compound) is typically in a range from 70:30 to 20:80, more preferably from 60:40 to 40:60.

Examples of a polymerization solvent usable in the exemplary embodiment include an aromatic solvent, naphthenic solvent and aliphatic hydrocarbon solvent. Specifically, the solvents such as benzene, toluene, xylene, cyclohexane, dimethylcyclohexane, and ethylcyclohexane are suitably usable. A used amount of the polymerization solvent is preferably in a range from 50 parts by mass to 500 parts by mass relative to 100 parts by mass of a mixture of the monomers, more preferably in a range from 60 parts by mass to 300 parts by mass.

Conventionally, for economic preferences, the polymerization solvent is recovered after the completion of the polymerization and is repeatedly used. However, the recovered solvent typically contains a low-molecular-weight component with a molecular weight approximately in a range from 250 to 300. However, when the content of the low-molecular-weight component is large, the polymerization solvent tends to exhibit insufficient physical properties as the tackifier.

In order to avoid degradation of the physical properties, the concentration of the low-molecular-weight component is at least set at 4 mass % or less when the solvent is reused as the polymerization solvent. The concentration thereof is more preferably 3.5 mass % or less. In other words, depending on the content of the low-molecular-weight component in the recovered polymerization solvent, the recovered polymerization solvent is directly used as the polymerization solvent at the start of the polymerization reaction, or alternatively is diluted with a fresh solvent so that the concentration of the low-molecular-weight component falls at 4 mass % or less, and then used as the polymerization solvent at the start of the polymerization reaction.

In the exemplary embodiment, by the start of the polymerization reaction, the polymerization solvent is preferably kept heated at 100 degrees C. or more, more preferably 150 degrees C. or more. The mixture of the cyclopentadiene compound and the vinyl aromatic compound is added to the heated solvent by a split addition to conduct a copolymerization reaction.

The vinyl aromatic compound used at this time contains 1000 mass ppm or less, preferably 100 mass ppm, of a high-molecular-weight component with a molecular weight from several tens of thousands to several hundreds of thousands detected by a reprecipitation method.

The copolymerization reaction preferably continues even after the split addition of the mixture of the cyclopentadiene compound and the vinyl aromatic compound. Though the reaction conditions at this time are not specifically limited, the typical reaction temperature is in a range from 150 degrees C. to 350 degrees C., more preferably 220 degrees C. to 300 degrees C. The reaction pressure is in a range from 0 MPa to 2 MPa, preferably from 0 MPa to 1.5 MPa. The reaction time is in a range from 1 hour to 10 hours, preferably from 1 hour to 8 hours.

Subsequently, the obtained reactant solution is subjected to a desolventizing process, for instance, at the temperature from 100 degrees C. to 300 degrees C., under the pressure from 1 mmHg to 100 mmHg, and for 1 hour to 3 hours to remove the volatile component (the low-molecular-weight component is also volatilizable in addition to the solvent), so that a copolymer is obtainable. When the content of the low-molecular-weight component is 4 mass % or less in the solvent at this time, the solvent can be directly reused in the thermal polymerization step.

The copolymer of the cyclopentadiene compound and the vinyl aromatic compound manufactured in the above thermal polymerization step has a softening point in a range from 50 degrees C. to 120 degrees C., the content of the vinyl aromatic compound unit in a range from 30 to 90 mass %, a bromine value in a range from 30 g to 90 g/100 g, and a number average molecular weight in a range from 400 to 1100.

Hydrogenation Reaction Step

In the hydrogenation reaction step, the copolymer obtained in the thermal polymerization step is hydrogenated in the presence of a hydrogenation solvent to perform a hydrogenation reaction.

This hydrogenation reaction can be performed by dissolving the copolymer in a solvent such as cyclohexane and tetrahydrofuran in the presence of nickel catalyst, palladium catalyst, cobalt catalyst, platinum catalyst and/or rhodium catalyst.

The reaction temperature at this time is typically in a range from 120 degrees C. to 300 degrees C., preferably from 150 degrees C. to 250 degrees C. The reaction pressure is typically in a range from 1 MPaG to 6 MPaG. The reaction time is in a range from 1 hour to 7 hours, preferably from 2 hours to 5 hours.

The reaction mixture obtained by the hydrogenation reaction step preferably has a viscosity in a range from 0.01 Pa·s to 1.0 Pa·s at the temperature in the volatile-component removal step, the viscosity being measured by a method according to JIS Z8803. When the viscosity falls within the above range, the volatile component can be more efficiently removed in the volatile-component removal step in the later stage.

Volatile-Component Removal Step

In the volatile-component removal step, a hydrogenated petroleum resin is separated from the reaction mixture obtained by the hydrogenation reaction step so that a hydrogenated low-molecular-weight component remains in a range from 6 mass % to 10 mass % in the hydrogenated petroleum resin.

At this time, excessive removal of the low-molecular-weight component adversely affects adhesive performance (e.g., constant-temperature creep) of a hot-melt adhesive composition containing the hydrogenated petroleum resin. In view of the above, in the exemplary embodiment, the content of the low-molecular-weight component in the hydrogenated petroleum resin needs to be in a range from 6 mass % to 10 mass %, preferably from 7 mass % to 8 mass %.

The volatile-component removal step is implemented using the above-described volatile-component removal device 10.

Specifically, first, the pressuring device 11 pressurizes the reaction mixture obtained by the hydrogenation reaction step. The pressuring device 11 preferably pressurizes the reaction mixture at a gauge pressure of 0.1 MPaG or more, more preferably at 0.3 MPaG or more, particularly preferably in a range from 0.64 MPaG to 1.0 MPaG. When the pressure of the pressuring device 11 is less than the above-described lower limit, the reaction mixture tends to foam before the reaction mixture is depressurized to deteriorate heat-transfer performance of the heater 12.

Subsequently, the reaction mixture pressurized by the pressuring device 11 is heated by the heater 12 under pressure. The heater 12 preferably heats the reaction mixture to a range from 100 degrees C. to 350 degrees C., more preferably to a range from 150 degrees C. to 350 degrees C., particularly preferably to a range from 200 degrees C. to 300 degrees C. When the heating temperature of the heater 12 is less than the above-described lower limit, the volatile component tends to be difficult to foam when the reaction mixture is depressurized in the later stage. On the other hand, when the heating temperature of the heater 12 exceeds the above-described upper limit, the reaction mixture tends to be easily degraded.

Further, the pressurized and heated reaction mixture is flowed into the decompression space depressurized by the decompression unit 13. The decompression unit 13 preferably depressurizes the decompression space to an absolute pressure of 6.67 kPaAbs or less (50 torr or less), more preferably to 4.67 kPaAbs or less (35 torr or less). When the pressure of the decompression space falls within the above-described range, the low-molecular-weight component can be removed without degrading the hydrogenated petroleum resin. In other words, in order to prevent a quality deterioration of a product due to odor of the volatile component, the residual amount of the volatile component is preferably 1500 mass ppm or less, more preferably 1200 mass ppm or less. Accordingly, when the heating temperature is set at 250 degrees C., which is a temperature condition for not degrading the hydrogenated petroleum resin, based on the vapor-liquid equilibrium value between the hydrogenated petroleum resin and the volatile component, the residual amount of the volatile component is preferably set within the above-described range.

Subsequently, the reaction mixture flowed in the decompression space of the decompression unit 13 is flowed into the plurality of flow paths 14A of the path member 14 disposed in the decompression space. A flow rate (F) of the reaction mixture, the average diameter (D) of the flow path 14A, and the number (N) of the flow paths 14A preferably satisfy a condition expressed by a numerical formula (F1) below. When the condition is satisfied, the volatile component can be more efficiently removed.

$$F/(\pi D \times N) \leq 1500 \text{ kg}/(h \cdot m) \tag{F1}$$

The hydrogenated petroleum resin can be thus manufactured. The hydrogenated petroleum resin obtainable in the exemplary embodiment preferably has a softening point in a range from 90 degrees C. to 160 degrees C., a content of the vinyl aromatic compound unit in a range from 0 mass % to 35 mass %, a bromine value in a range from 0 g/100 g to 30 g/100 g, and a number average molecular weight in a range from 500 to 1100. In other words, the hydrogenation in the exemplary embodiment is preferably a partial hydrogenation or a perfect hydrogenation, in which even an aromatic ring is hydrogenated.

Modification(s) of Embodiment(s)

It should be understood that the above-described exemplary embodiment(s) demonstrates an exemplary embodiment of the invention and the scope of the present invention is not limited to the above-described exemplary embodiment(s) but includes modifications and improvements as long as the modifications and improvements are compatible with the invention. Further, the specific arrangements and configurations may be altered in any manner as long as the modifications and improvements are compatible with the invention.

For instance, the path member 14 may be provided in a form of a porous member having a bent flow path or a branched flow path instead of a straight flow path, or alternatively in a form of a mesh member. Moreover, under the condition that the flow rate is small, the path member 14 may be provided in a form of a single-hole member instead of the porous member.

EXAMPLE(S)

Next, the invention will be described more in detail with reference to Example and Comparative. However, the invention is not limited by these Example and Comparative.

Example 1

Thermal Polymerization Step

Xylene recovered from the polymerization reaction solution was collected in a polymerization reactor provided with a stirrer and purged with nitrogen, heated to 260 degrees C., and added with stirring with a mixture of (di)cyclopentadiene (i.e., a mixture of cyclopentadiene and dicyclopentadiene) and styrene (a mass ratio of 1:1). Subsequently, the copolymerization reaction continued for 180 minutes.

After the completion of the reaction, the obtained reactant was depressurized to the pressure of 30 mHg, from which unreacted monomers and xylene were removed, so that a copolymer of (di)cyclopentadiene and styrene was obtained.

Hydrogenation Reaction Step

Ethylcyclohexane (solvent) and the copolymer obtained in the thermal polymerization step (mass ratio of 3:1) were continuously put in the hydrogenation reactor. The obtained solution was subjected to a hydrogenation reaction at the hydrogen pressure of 5.0 MPaG and the temperature in a range from 150 degrees C. to 250 degrees C.

The obtained hydrogenated reactant was continuously passed through a first separator and a second separator, in which the temperature and the pressure were different, to remove unreacted hydrogen and a part of ethylcyclohexane, so that a hydrogenated copolymer of (di)cyclopentadiene and styrene was obtained. An antioxidant was added to the obtained hydrogenated copolymer. A viscosity of the obtained hydrogenated copolymer was measured by the method according to JIS Z8803. The viscosity at the temperature of 230 degrees C. in the volatile-component removal step was 0.07 Pa·s.

Volatile-Component Removal Step

The hydrogenated copolymer obtained in the hydrogenation reaction step was subjected to the volatile-component removal step using the volatile-component removal device 10 shown in FIG. 1 under the following conditions, so that a hydrogenated petroleum resin was obtained.
Gauge pressure of the pressuring device: 0.35 MPaG
Heating temperature of the heater: 245 degrees C.
Pressure in the decompression space: 4.13 kPaAbs
Flow rate (F): 16.5 kg/h
Average diameter (D) of the flow path of the path member: 0.006 m (6 mm)
Number (N) of the flow path of the path member: 1
Value obtained by $F/(\pi D \times N)$: 875 kg/(h·m)

Manufacture of Hot-Melt Adhesive

The obtained hydrogenated petroleum resin, SEBS copolymer (manufactured by Shell Japne, product name: Kraton G1652), oil (manufactured by Idemitsu Kosan Co., Ltd., product name: PS-32), an antioxidant (manufactured by BASF Japan, product name: IRGANOX 1010) were kneaded using a kneading machine (Labo Plastomill) at 140 degrees C. for 40 minutes to manufacture a hot-melt adhesive.

Comparative 1

A hydrogenated petroleum resin was obtained in Comparative 1 in the same manner as in Example 1 except that the volatile-component removal device was replaced by a thin-film evaporator (manufactured by Hitachi Plant Technologies, Ltd., "Horizontal Kontro") in the volatile-component removal step.

Moreover, a hot-melt adhesive was obtained in Comparative 1 in the same manner as in Example 1 except that the hydrogenated petroleum resin obtained in Comparative 1 was used.

Evaluation

Properties (the residual amount of the volatile component and the softening point of the hydrogenated petroleum resin, and adhesive force, loop tack and holding force of the hot-melt adhesive) in each of Example 1 and Comparative 1 were evaluated according to the following methods. The obtained results are shown in Table 1.

(i) Residual Amount of the Volatile Component

The residual amount of the volatile component was measured by an analysis by gas chromatography.

(ii) Softening Point

The softening point was measured in accordance with JIS K2207.

(iii) Adhesive Force

The adhesive force was measured in accordance with JIS Z0237 (the measurement temperature: 23 degrees C.).

(iv) Loop Tack

The loop tack was measured in accordance with FINAT test standard (the measurement temperature: 23 degrees C.).

(v) Holding Force

The holding force was measured in accordance with JIS Z0237 (the measurement temperature: 50 degrees C.). Specifically, a shift width was measured after the elapse of 60 minutes.

TABLE 1

| | | Example 1 | Comparative 1 |
|---|---|---|---|
| Hydrogenated Petroleum Resin | Residual amount of the volatile component (mass ppm) | 880 | 890 |
| | Softening point (° C.) | 125.5 | 124.0 |
| Hot-Melt Adhesive | Adhesive force (N/cm) | 9.03 | 8.77 |
| | Loop tack (N/cm) | 3.86 | 4.16 |
| | Holding force (mm) | 303 | 310 |

As clearly understood from the results shown in Table 1, the hydrogenated petroleum resin obtained in Example 1 was confirmed to have substantially the same properties as those of the hydrogenated petroleum resin obtained in Comparative 1 using the thin-film evaporator requiring high equipment costs. Consequently, according to the manufacturing method of the hydrogenated petroleum resin of the invention, it was confirmed that the equipment costs was reducible while improving the tackiness of the tackifier resin.

The invention claimed is:

1. A manufacturing method of a hydrogenated petroleum resin, comprising:
    thermally polymerizing a cyclopentadiene compound and a vinyl aromatic compound;
    hydrogenating a copolymer obtained by the thermally polymerizing in the presence of a hydrogenation solvent to perform a hydrogenation reaction; and
    removing volatile component(s) by separating a hydrogenated petroleum resin from a reaction mixture obtained by hydrogenating the copolymer so that a hydrogenated low-molecular-weight component remains in a range from 6 mass % to 10 mass % in the hydrogenated petroleum resin,
    wherein the removing volatile-component(s) is performed using a volatile-component emoval device comprising:
    a pressuring device configured to pressurize the reaction mixture; a heater configured to heat the reaction mixture pressurized by the pressuring device under pressure;
    a decompression unit comprising a decompression space, a pressure of which is reduced and into which the pressurized and heated reaction mixture is flowed; and
    a path member comprising a flow path through which the reaction mixture passes and provided in the decompression space so that the reaction mixture flowed in the decompression space of the decompression unit passes through the flow path.

2. The manufacturing method of the hydrogenated petroleum resin according to claim 1, wherein
a flow ate (F) of the reaction mixture, an average diameter (D) of the flow path, and the number (N) of the flow path satisfy a condition expressed by a numerical formula (F1) below:

$$F/(\pi D \times N) \leq 1500 \text{ kg}/(h \cdot m) \quad (F1).$$

3. The manufacturing method of the hydrogenated petroleum resin according to claim 1, wherein the hydrogenated petroleum resin obtained by removing the volatile-component(s) has a softening point in a range from 90 degrees C. to 160 degrees C.

4. The manufacturing method of the hydrogenated petroleum resin according to claim 1, wherein the average diameter (D) of the flow path is in a range from 0.001 m (1 mm) to 0.02 m (20 mm).

5. The manufacturing method of the hydrogenated petroleum resin according to claim 1, wherein the number (N) of the flow path is in a range from 1 to 100,000.

6. The manufacturing method of the hydrogenated petroleum resin according to claim 1, wherein the reaction mixture has a viscosity in a range from 0.01 Pa·s to 1.0 Pa·s at a temperature when removing the volatile-component(s), the viscosity being measured by a method according to JIS Z8803.

7. The manufacturing method of the hydrogenated petroleum resin according to claim 1, wherein the heater is configured to heat the reaction mixture to a range from 100 degrees C. to 350 degrees C.

8. The manufacturing method of the hydrogenated petroleum resin according to claim 1, wherein the pressuring device is configured to pressurize the reaction mixture to 0.1 MPaG or more.

9. The manufacturing method of the hydrogenated petroleum resin according to claim 1, wherein the decompression unit is configured to depressurize the reaction mixture to 6.67 kPaAbs or less.

* * * * *